(12) United States Patent
Thornburg

(10) Patent No.: US 6,931,311 B2
(45) Date of Patent: Aug. 16, 2005

(54) TORQUE SENSING FOR A STEERING SYSTEM

(75) Inventor: Steven Dale Thornburg, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 36 days.

(21) Appl. No.: 10/250,551

(22) PCT Filed: Feb. 7, 2002

(86) PCT No.: PCT/US02/03769

§ 371 (c)(1),
(2), (4) Date: Jul. 1, 2003

(87) PCT Pub. No.: WO02/062602

PCT Pub. Date: Aug. 15, 2002

(65) Prior Publication Data

US 2004/0050616 A1 Mar. 18, 2004

Related U.S. Application Data

(60) Provisional application No. 60/266,979, filed on Feb. 7, 2001.

(51) Int. Cl.⁷ .................................................. B62D 6/00
(52) U.S. Cl. ........................................ 701/41; 180/446
(58) Field of Search .............................. 180/400, 443, 180/271, 280, 428, 421; 340/465; 701/41–44; 700/279

(56) References Cited

U.S. PATENT DOCUMENTS 4,660,671 A * 4/1987 Behr et al. .................. 180/446
5,020,616 A   6/1991 Yagi et al.
5,369,583 A * 11/1994 Hazelden .................... 701/48
5,608,394 A   3/1997 Hirabayashi
6,018,691 A * 1/2000 Yamamoto et al. .......... 701/41
6,044,723 A   4/2000 Eda et al.
6,295,879 B1  10/2001 Miller et al.
6,389,910 B1 * 5/2002 Eisenhauer ............ 73/862.193
6,450,044 B1 * 9/2002 Eisenhauer et al. .... 73/862.193
6,543,571 B2 * 4/2003 Tokumoto .................. 180/446

FOREIGN PATENT DOCUMENTS

| EP | 1 035 002 A2 | 9/2000 |
| WO | WO 99/09385 | 2/1999 |
| WO | WO 99/31474 | 6/1999 |
| WO | WO 01/42753 A1 | 6/2001 |

* cited by examiner

Primary Examiner—Thomas G. Black
Assistant Examiner—Christine M. Behncke
(74) Attorney, Agent, or Firm—Brinks Hofer Gilson & Lione

(57) ABSTRACT

A steering assembly for a vehicle, including an input shaft connectable to a steering input system, an output shaft connectable to a steering output system, a torsion device connecting the input shaft and the output shaft and allowing relative rotation movement between the input shaft and the output shaft based upon a torque applied to the input shaft or the output shaft, a first sensor of sensing relative rotational movement of the input shaft and the vehicle, and a second sensor for sensing relative rotational movement of the output shaft and the vehicle.

17 Claims, 2 Drawing Sheets

TORQUE SENSING FOR A STEERING SYSTEM

CROSS-REFERENCE TO RELATED APPLICATIONS

The present application is a U.S. national phase application of international application No. PCT/US02/03769, filed Feb. 7, 2002, which claims priority to U.S. application Ser. No. 60/266,979, filed Feb. 7, 2001.

The present invention claims priority to U.S. Provisional Application Ser. No. 60/266,979, filed on 7 Feb. 2001 and entitled "Method and Device for Detecting Steering Torque."

TECHNICAL FIELD

The present invention generally relates to power assisted steering systems and, more specifically, to power assisted steering systems that differentiate between forces originating at a steering input and forces originating at a steering output.

BACKGROUND

As an attempt to increase fuel-efficiency of automobiles, electric power assisted steering systems have been introduced to the automotive market. These systems assist in steering vehicles by applying additional torque to the steering system whenever torque is sensed in the steering shaft. Although these systems have increased feul-efficency, they are unable to differentiate between torque created by forces at the steering input and at the steering output. Forces originating at the steering output may be the result of the road wheel coming into contact with a curb or a large bump in the road, while forces originating at the steering input are those forces that a driver applies. Because the currently exsisting systems are unable to differentiate between these forces, the forces originating at the steering output (e.g. a road wheel) are sensed as an input torque and cause the system to apply additional torque to the steering shaft in the same direction, thereby causing vibration in the steering input (e.g. a steering wheel) and decreasing stability of the system.

While it is important to reduce the effort drivers must use to steer a vehicle, it is of equal importance to resist forces that originate at the steering output. Forces originating at the steering output sometimes steer the vehicle in an unintended direction and applying additional torque to the steering shaft may exacerbate this problem. For these reasons, there is a need in the automotive art, if not other arts, for a power assisted steering system that is able to distinguish between forces originating at the steering input and the steering output and to react to these forces differently.

DETAILED DESCRIPTION OF THE PREFERRED EMBODIMENT

The following description of the preferred embodiment of the invention is not intended to limit the scope of this invention to this embodiment, but rather to enable any person skilled in the art of power assisted steering systems to make and use the invention.

Figure 1:
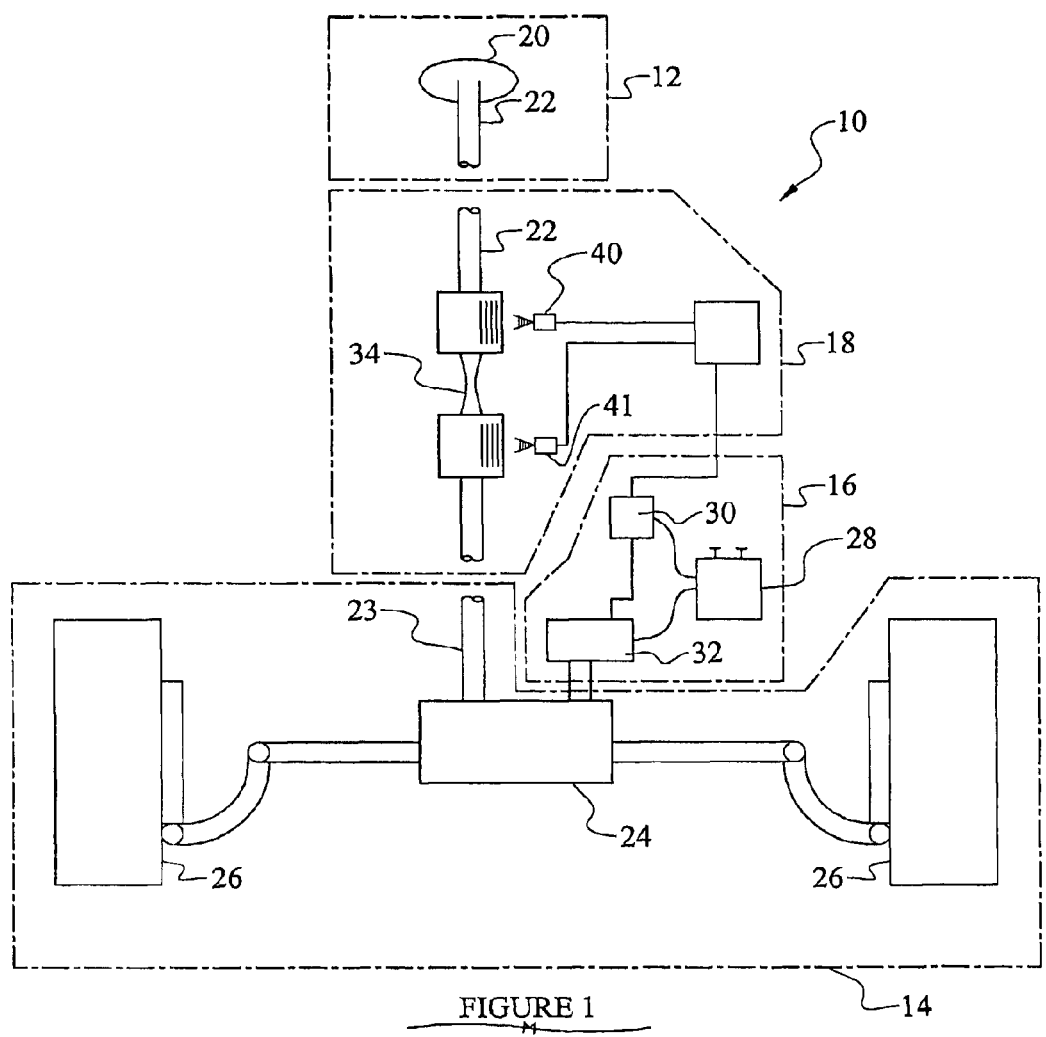
FIG. 1 is a schematic top view of the preferred embodiment.

As shown in FIG. 1, the steering system 10 of the preferred embodiment includes a steering input subsystem 12, a steering output subsystem 14, a steer assist subsystem 16, and a torque sensing subsystem 18. The steering system 10 is capable of determining the magnitude and origination of an applied torque on the steering system 10, which decreases the vibration and increases the stability of the steering system 10.

The steering input subsystem 12 of the preferred embodiment includes a steering input device 20 and an input shaft 22. The steering input device 20 functions to receive forces from a driver of the vehicle and transfer those forces to input shaft 22. The steering input device 20 is preferably a conventional steering wheel, but may alternatively be any suitable device for receiving forces from the driver of the vehicle. The steering input device 20 is preferably fastened to the input shaft 22 with conventional fasteners. The input shaft 22, which functions to transfer the forces from the driver through the steering system 10, is preferably a conventional solid shaft, but may alternatively be any suitable device.

The steering output subsystem 14 of the preferred embodiment includes an output shaft 23, a rack-and-pinion device 24, and road wheels 26. The output shaft 23, which functions to receive torque from the input shaft 22 and transfer the torque to the rack-and-pinion device 24, is preferably a conventional solid shaft, but may alternatively be any suitable device. The output shaft 23 is preferably fastened to the rack-and-pinion device 24 with conventional fasteners. The rack-and-pinion device 24, which functions to convert the rotational movement of the output shaft 23 into a pivoting movement of the road wheels 26, is preferably a conventional device. In alternative embodiments, any suitable device, such as a recirculating-ball device, may be used to pivot the road wheels 26. The road wheels 26, which function to communicate with a road surface, are preferably connected to the rack-and-pinion device 24 with conventional fasteners. The road wheels 26 are preferably conventional road wheels, but may alternatively be any suitable device to communicate with a surface, such as a ski on a snow mobile or a rudder on a watercraft.

The steer assist subsystem 16 of the preferred embodiment includes a power supply 28, a control unit 30, and an assist motor 32. The steer assist subsystem 16 functions to assist the steering output subsystem 14 and turn the road wheels 26 according to the intent of the driver. The power supply 28 is preferably a conventional battery within the vehicle, but may alternatively be a dedicated power supply for the steering system 10, or may be any suitable device able to power the control unit 30 and the assist motor 32. The control unit 30, which functions to receive data signals from a computational unit (discussed below) and to control the torque and direction of the output of the assist motor 32, is preferably connected to assist motor 32 with conventional wires. The control unit 30 is preferably a conventional microprocessor with a look up menu that determines an appropriate command for the assist motor 32. The assist motor 32 is preferably coupled to the rack-and-pinion device 24 and in communication with the control unit 30. The assist motor 32 functions to apply torque to the rack-and-pinion device 24 in accordance with the commands received from the control unit 30. The additional torque serves to decrease the effort required by the driver to steer the vehicle and/or to reduce the effects of external forces acting on road wheels 26. The assist motor 32 preferably applies torque directly to the rack-and-pinion device 24. Alternatively, the assist motor 32 may indirectly apply torque to the rack-and-pinion device 24. For example, assist motor 32 may apply force directly to output shaft 23, thereby resulting in increased or decreased torque within the rack-and-pinion device 24. The assist motor 32 is preferably a conventional electric motor, but may alternatively be any suitable device with a significant output to assist in the steering or reduce the vibrations of the steering system 10.

Figure 2:
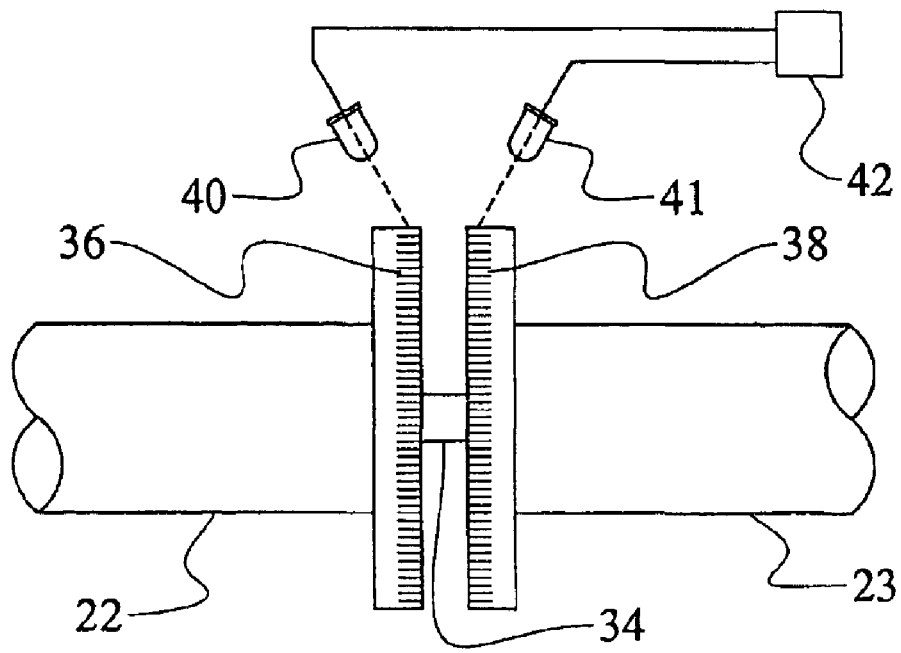
FIG. 2 is a detailed view of the torque sensing subsystem of the preferred embodiment.
Figure 3:
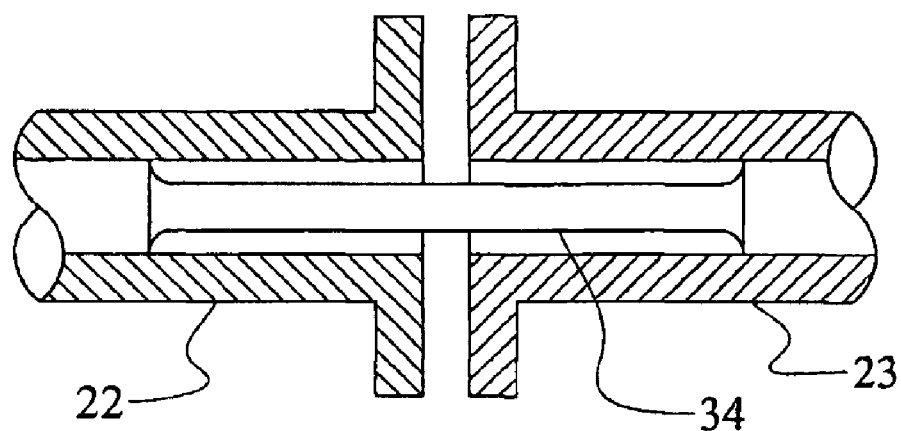
FIG. 3 is a cross-sectional view of the torque sensing subsystem of FIG. 2.

As shown in FIGS. 2 and 3, the torque sensing subsystem 18 of the preferred embodiment includes a torsion device 34, an input indicator 36, an output indicator 38, an input sensor 40, an output sensor 41, and a computation unit 42. The torque sensing subsystem 18 is capable of determining the amount of torque being applied to the input shaft 22 and to the output shaft 23. In addition, the torque sensing system 18 is capable of determining where the torque originated.

The torsion device 34 connects the input shaft 22 to the output shaft 23 and functions to allow relative rotational motion between the input shaft 22 and the output shaft 23. The torsion device 34 is preferably a conventional torsion bar, but may alternatively be any suitable device capable of allowing relative rotational movement between the input shaft 22 and the output shaft 23 based upon a torque applied to the input shaft 22 or the output shaft 23.

The input indicator 36 and the output indicator 38 are preferably located on the input shaft 22 and the output shaft 23, respectively. The purpose of the indicators 36 and 38 is to facilitate measurement of the rotational movement of the input shaft 22 and the output shaft 23 at the location of the indicators 36 and 38. The indicators 36 and 38 are preferably barcodes. Alternatively, any other mark capable of being tracked and having its rotational movement measured may be used, such as formed grooves or striations.

The input sensor 40 and the output sensor 41 are preferably connected to the computation unit 42. The sensors 40 and 41 function to measure movement of the indicators 36 and 38 and transmit movement data to the computation unit 42. Preferably, the sensors 40 and 41 are conventional optical sensors. Alternatively, any other suitable device capable of measuring the movement of the indicators 36 and 38 and transmitting the movement data may be used.

The computation unit 42 functions to convert the movement data that it receives from the sensors 40 and 41 into torque measurements based upon a predetermined relationship between applied torque and relative rotational movement. Preferably, the computation unit 42 contains a look-up menu to accomplish this purpose. Upon receiving the movement data from the sensors 40 and 41, the computation unit 42 locates the torque measurement within the look-up menu that correlates with the particular movement data that is received. Alternatively, the computation unit 42 may use any suitable method to determine torque based on the movement data.

The computation unit 42 also functions to determine the location at which the measured torque was first detected. In other words, the computation unit 42 determines if the torque on the torsion device 34 originated from the road surface through the road wheels 26 or from the driver through the steering input device 20. If rotational movement was first detected at the input indicator 36, it may be concluded that the originating source was the steering input subsystem 12. Likewise, if the rotational movement was first detected at the output indicator 38, it may be concluded that the originating source was steering output subsystem 14.

The computation unit 42 further functions to transmit commands to the assist motor 32 based on the determinations of the magnitude and origination of the applied torque. If the computation unit 42 concludes that the originating source was the steering input subsystem 12, then it will transmit a signal to the control unit 30 commanding it to have additional torque applied to the rack-and-pinion device 24 in the same direction as the measured torque. Otherwise, if the computation unit 42 concludes that the originating source was steering output subsystem 14, then it will transmit a signal to the control unit 30 commanding it to reduce the external torque applied to the rack-and-pinion device 24. The reduction of the torque is preferably accomplished by applying an opposing torque with the assist motor 32, but may be alternatively accomplished by negating at least some of the torque. The computation unit 42 is preferably connected to the control unit 30 by conventional wires, but may alternatively be connected by any suitable means, such as fiber optics. Further, the computation unit 42 and the control unit 30 may be embodied in a single device, which would allow the single device to transmit commands directly to the assist motor 32 without any external connection.

As any person skilled in the art of power assisted steering systems will recognize from the previous detailed description and from the FIGURES and claims, modifications and changes can be made to the preferred embodiment of the invention without departing from the scope of the invention defined in the following claims.

What is claimed is:

1. A torque sensing subsystem for a steering system of a vehicle, comprising:
   an input shaft connectable to a steering input subsystem;
   an output shaft connectable to a steering output subsystem;
   a torsion device connecting said input shaft and said output shaft and allowing relative rotational movement between said input shaft and said output shaft based upon a torque applied to said input shaft or said output shaft;
   a first sensor for sensing relative rotational movement of said input shaft and the vehicle;
   a second sensor for sensing relative movement of said output shaft and the vehicle; and
   a computation unit in communication with said first sensor and said second sensor and configured to determine the magnitude and origination of the applied torque.

2. The subsystem of claim 1, wherein an input indicator is located on said input shaft and an output locator is located on said output shaft, and said first sensor is adapted to sense movement of said input indicator and said second sensor is adapted to sense movement of said output indicator.

3. The subsystem of claim 2, wherein said input indicator and said output indicator are barcodes.

4. The subsystem of claim 1, wherein said first sensor and second sensor are optical sensors.

5. The subsystem of claim 1, wherein said computation unit is adapted to transmit signals to a steer assist subsystem, which applies torque to the steering output subsystem.

6. A method of stabilizing a steering system of a vehicle including a steering input subsystem having a steering input device for a driver of the vehicle, a steering output subsystem having a road wheel, an input shaft coupled to the steering input device, and output shaft coupled to the road wheels, and a torsion device connecting the input shaft and the output shaft and allowing relative rotational movement between the input shaft and the output shaft based upon a torque applied to the input shaft or the output shaft, said method comprising;

measuring rotational movement of the input shaft relative to the vehicle, and measuring rotational movement of the output shaft relative to the vehicle;

converting the rotational movements into torque measurements based upon a predetermined relationship between applied torque and relative rotational movement of the input shaft and the output shaft;

determining whether the torque on the torsion device originated from a road surface through the road wheel or from the driver through the steering input device;

if the torque originated from the road surface, then reduce the external torque to the steering output subsystem by applying an opposing torque; and if the torque originated from the driver, then increase the torque to the steering output subsystem by applying additional torque.

7. The method of claim 6, wherein said act of reducing the torque to the steering output subsystem includes negating at least some of the torque.

8. A steering system for a vehicle, comprising:

a steering input subsystem;

a steering output subsystem;

an input shaft coupled to said steering input subsystem;

an output shaft coupled to said steering output subsystem;

a torsion device connecting said input shaft and said output shaft and allowing relative rotational movement between said input shaft and said output shaft based upon a torque applied to said input shaft or said output shaft;

a first sensor sensing the relative rotational movement of said input shaft and the vehicle;

a second sensor sensing the relative rotational movement of said output shaft and the vehicle; and a computation unit in communication with said first sensor and said second sensor and configured to determine the magnitude and origination of the applied torque.

9. The system of claim 8, wherein said steering input subsystem includes a steering wheel connected to said input shaft.

10. The system of claim 8, wherein said steering output subsystem includes a rack-and-pinion device connecting said output shaft to a road wheel and adapted to actuate the road wheel.

11. The system of claim 8, wherein an input indicator is located on said input shaft and an output indicator is located on said output shaft, and said first sensor is adapted to sense movement of said input indicator and said second sensor is adapted to sense movement of said output indicator.

12. The assembly of claim 11, wherein said input indicator and said output indicator are barcodes.

13. The assembly of claim 8, wherein said first sensor and second sensor are optical sensors.

14. The system of claim 8, wherein said computation unit is adapted to transmit signals to a steer assist system, which applies torque to said steering output subsystem.

15. The system of claim 14, wherein said steering output subsystem includes a rack-and-pinion device and the steer assist subsystem applies torque directly to said rack-and-pinion device.

16. A method of stabilizing a steering system of a vehicle including a steering output subsystem having a steering input device for a driver of the vehicle, a steering output subsystem having a road wheel, an input shaft coupled to the steering input device, an output shaft coupled to the road wheels, and a torsion device connecting the input shaft and the output shaft and allowing relative rotational movement between the input shaft and the output shaft based upon a torque applied to the input shaft of the output shaft, said method comprising:

measuring rotational movement of the input shaft relative to the vehicle, and measuring rotational movement of the output shaft relative to the vehicle converting the rotational movements into torque measurements based upon a predetermined relationship between applied torque and relative rotational movement of the input shaft and the output shaft; and determining whether the torque on the torsion device originated from a road surface through the road wheel or from the driver through the steering input device.

17. The method of claim 16, further comprising applying torque to the steering output subsystem in accordance with the following rules:

if the torque originated from the road surface, then reduce the external torque to the steering output subsystem; and if the torque originated from the driver, then increase the torque to the steering output subsystem by applying additional torque.

* * * * *

UNITED STATES PATENT AND TRADEMARK OFFICE
CERTIFICATE OF CORRECTION

PATENT NO. : 6,931,311 B2
DATED : August 16, 2005
INVENTOR(S) : Steven Dale Thornburg It is certified that error appears in the above-identified patent and that said Letters Patent is hereby corrected as shown below:

<u>Column 4,</u>
Line 13, after "for sensing relative" insert -- rotational --.

Signed and Sealed this

Sixth Day of June, 2006

JON W. DUDAS
*Director of the United States Patent and Trademark Office*